Oct. 23, 1962 C. HILL 3,059,504
VARIABLE SPEED AND TORQUE TRANSMISSION
Filed June 23, 1959 4 Sheets-Sheet 1

Inventor
Claude Hill
By
Wolfe, Hubbard, Voit & Osann
Attorneys.

Oct. 23, 1962

C. HILL 3,059,504

VARIABLE SPEED AND TORQUE TRANSMISSION

Filed June 23, 1959

Inventor
Claude Hill
By
Wolfe, Hubbard, Voit & Osann
Attorneys

Oct. 23, 1962 C. HILL 3,059,504
VARIABLE SPEED AND TORQUE TRANSMISSION
Filed June 23, 1959 4 Sheets-Sheet 3

Inventor
Claude Hill
By
Wolfe, Hubbard, Voit & Osann Attorneys

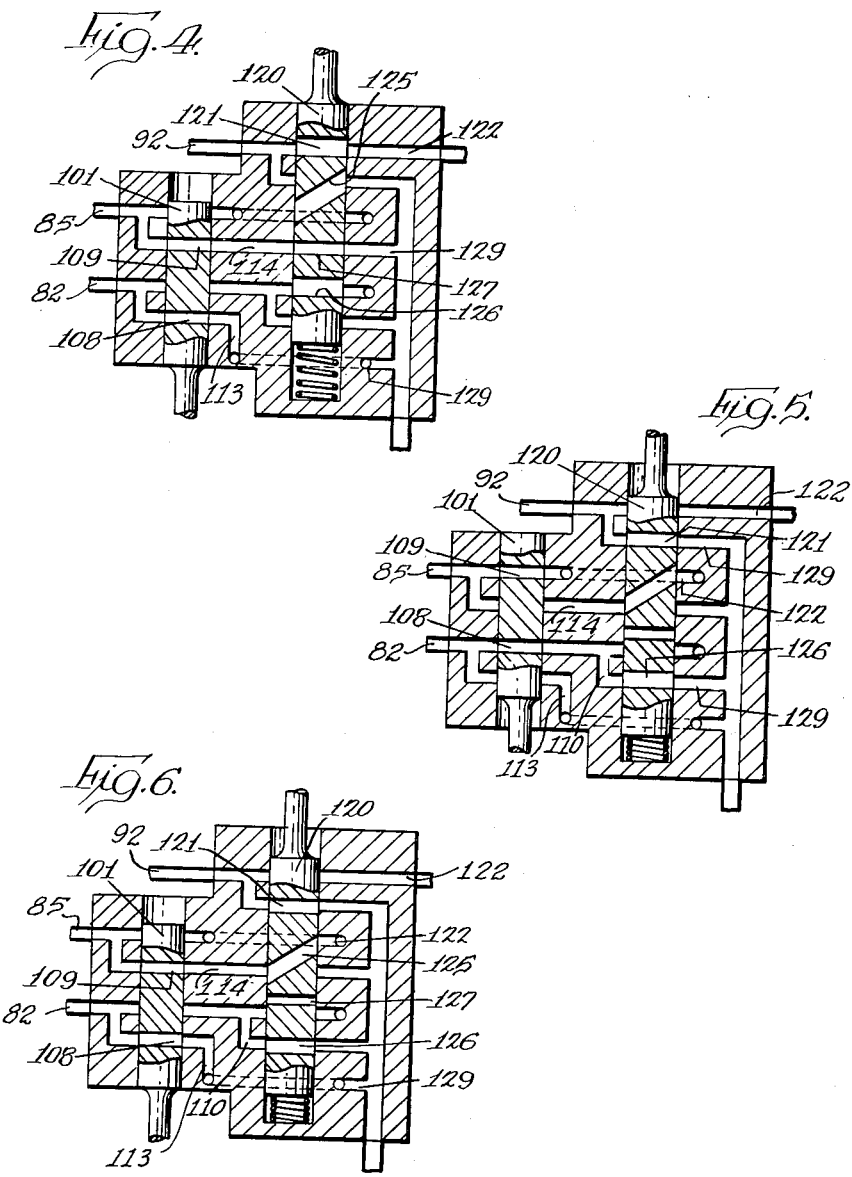

United States Patent Office 3,059,504
Patented Oct. 23, 1962

3,059,504
VARIABLE SPEED AND TORQUE TRANSMISSION
Claude Hill, Kenilworth, England, assignor to Harry Ferguson Research Limited, Gloucestershire, England, a British company
Filed June 23, 1959, Ser. No. 822,312
8 Claims. (Cl. 74—732)

This invention relates to variable speed and torque transmissions, and particularly to such transmissions which include as one component thereof a fluid torque converter. While not limited in its field of applicability, the invention finds especially advantageous use in automotive vehicles wherein reversible drive to road wheels is required from a variable speed engine which idles when the vehicle is at rest.

It is the general aim of the invention to provide an improved transmission, usable in automotive vehicles and including a fluid torque converter, characterized by ease of shifting and engaging positive clutch elements when the vehicle is at rest with the engine idling, and by readily obtained braking torque applicable from the transmission to the road wheels when the vehicle is coasting.

More specifically, it is an object of the invention to assure that when the input member of the transmission is rotating at idling speed, a positive tooth clutch on the output side of the fluid torque converter may be readily engaged or disengaged by eliminating the "drag" or tendency of the converter output element to rotate. In this connection, it is an object to achieve such ease in shifting a positive clutch without the necessity of a disengageable main friction clutch interposed between a driving power source (engine) and the torque converter, and which would be required to transmit the full torque of the engine.

Another object is to provide for shifting of a positive tooth clutch between forward, neutral, and reverse positions, together with means rendered effective automatically as an incident to such shifting for inhibiting "drag" or rotation of the output element of an associated fluid torque converter.

An additional object of the invention is to make it possible selectively to create braking torque on the output member of a transmission which includes a fluid torque converter, thus enabling a vehicle operator to retard the coasting vehicle independently of or in assistance to the action of the wheel brakes.

A further object is to provide a transmission in which a two-ratio "performance gear" is interposed between a driving source or engine and the input element of the torque converter, such performance gear being set to a neutral condition automatically when a reversing clutch on the output side of the torque converter is being shifted.

Still another object is to provide for forward-reverse drive selection and selection of braking action on the transmission output member by means of a single movable lever.

An additional object of the invention is to provide a transmission having the foregoing advantageous characteristics, and yet which may be embodied in a compact, rugged and reliable mechanical assembly.

Other objects and advantages will become apparent from the following description, taken in conjunction with the accompanying drawings, in which:

FIG. 2 is a perspective illustration of a shiftable control lever together with linkages and locking means associated therewith;

Figure 3:
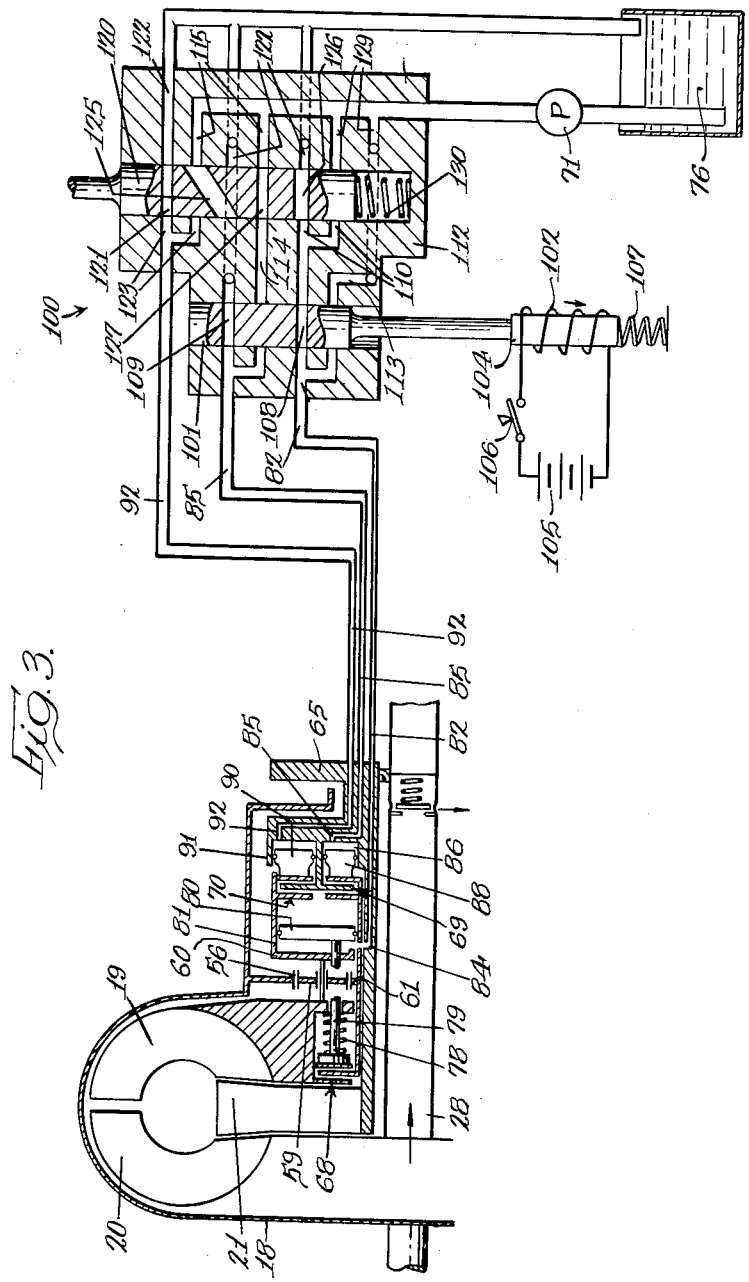

FIG. 3 is a diagrammatic illustration of the transmission and the hydraulic conduits and control means associated therewith; and FIGS. 4, 5 and 6 are cross-sectional views of a control valve assembly corresponding to that illustrated in FIG. 3, but respectively illustrating the positions of control valves when the transmission is conditioned for (a) reduced ratio driving operation, (b) braking operation, and (c) shifting operation, respectively.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

Referring now to the drawings, the exemplary embodiment of the invention is shown as a transmission 10 having a main input member 11 and a main output member 12. By way of example, the input member 11 is adapted for connection, through an appropriate flexible joint partially illustrated at 14, to the crank shaft of a conventional automotive engine (not shown). The output member 12, on the other hand, may be drivingly connected through appropriate well known means such as drive shafts, differentials and axles, to the road wheels of an automotive vehicle. The transmission as a whole is contained within a stationary housing 15, 15a which may be mounted on the chassis of a conventional automobile or truck.

As a first component of the transmission, a fluid torque converter 16 is arranged to be driven from the input member 11 and the power source or engine connected to the latter. The torque converter comprises a rotatable casing 18, to which the input member 11 is rigidly attached, as by welding. The casing is adapted to contain an appropriate fluid or oil, and surrounds an annular impeller 19 having blades or vanes 19a, an annular output element or turbine 20 having vanes or blades 20a, and a reactor or guide wheel 21 which is normally stationary. The input element or impeller 19 is rotatably driven from the casing 18 in a manner which will be described below. The reactor 21 is splined at 21a to outer part 24 of a one-way overrun device having a one-way connection through rollers 25 with a stationary sleeve 22. With this arrangement, the reactor 21 is free to rotate in the same direction as the turbine 20, but is locked against rotation in the opposite direction. Rotation of the impeller drives the "runner" or turbine 20 in a well known manner, and the latter is connected, as by splines at 26, to a hollow shaft 28 extending lengthwise through substantially the entire transmission.

Because the casing 18, impeller 19 and turbine 20 are always driven in the same direction, reverse drive of the main output shaft or member 12 is obtained by means of a reversing gear 29 interposed between the shaft 28 and the final output member 12. As here shown, the reversing gear 29 is a planetary gear set which includes a sun gear 30 fixed to or formed integrally on the end of the shaft 28. Meshed with the sun gear 30 are a plurality of annularly spaced planet gears 31 carried by and journaled on a planet carrier 32. The planet gears, in turn, mesh with an internal ring gear 34 formed on an annular part 35 which is drivingly connected, as by splines at 36, to the main output shaft 12.

To selectively control the reversing gear assembly 29 so that the output shaft 12 is driven in "forward" or "reverse" directions, a positive clutch element 38 is made rotationally fast on but longitudinally shiftable relative to the planet carrier 32. As here shown, the clutch element 38 is splined at 37 to the carrier 32, the splines forming a first set of positive clutch teeth 38a which are adapted to engage and lock with stationary teeth 39 carried by a stationary part 40 connected to the housing 15. When the clutch element 38 is shifted to the left (FIG. 1), so that the clutch teeth 38a, 39 engage, the planet carrier 32 is constrained against bodily rotation so that rotation of the sun gear 30 causes rotation of the planet gears 31 about their individual axes, and the latter rotationally drive the ring gear 34 and the output shaft 12 in a first or "reverse" direction.

Further, the clutch element 38 is formed with positive clutch teeth 38b which are adapted to engage with the teeth 34 of the ring gear whenever the clutch element is shifted to the right. This locks the differential gear so that the planet carrier 32 and ring gear 34 rotate in unison with the sun gear 30, thus driving the main output member 12 in a "forward" direction.

Figure 1:
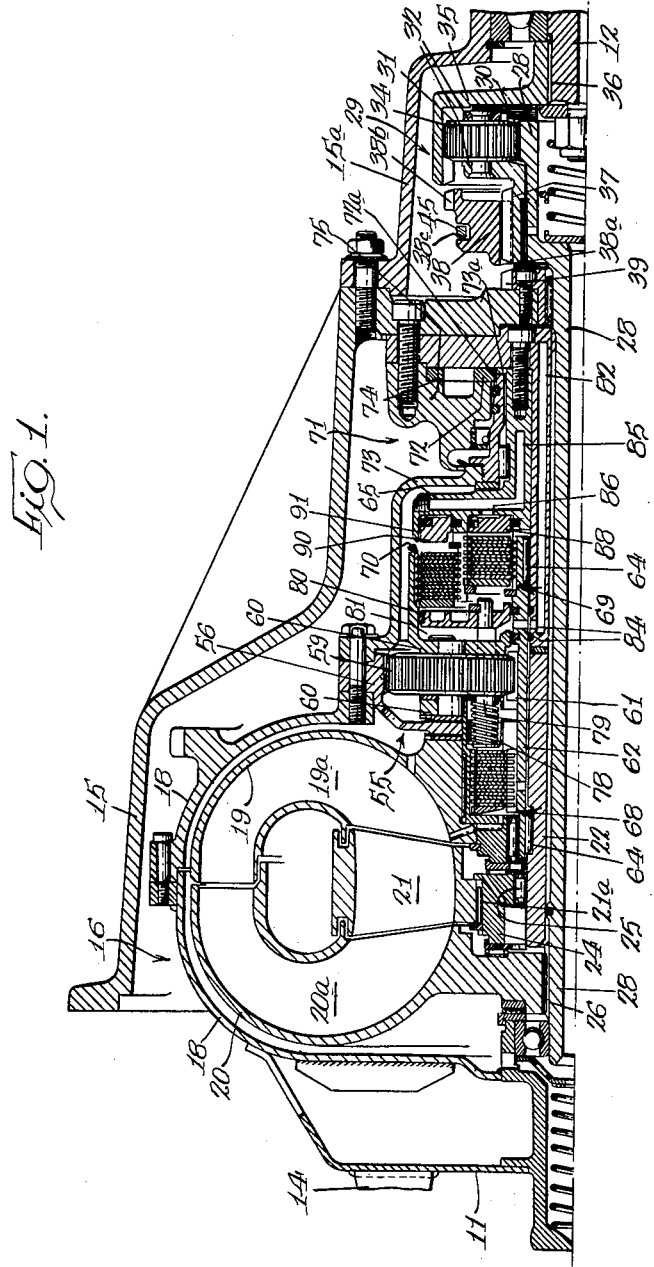
FIGURE 1 is a longitudinal cross-sectional view of a transmission embodying the features of the invention, only the upper half being illustrated inasmuch as the assembly is substantially symmetrical about its longitudinal axis.

The positive clutch element 38 may be shifted between the neutral position illustrated in FIG. 1, the "forward" position to engage the clutch teeth 38b, 34, or the "reverse" position to engage the teeth 38a, 39 by means of a shifter yoke 45 located in an annular groove 38c (FIG. 1). This shifter yoke 45 is illustrated in FIG. 2 as mounted on a slidable rod 46 carrying a slotted projection 48 engaged by a finger 49 depending from a rock shaft 50. For shifting the yoke 45 and the clutch element 38 to forward, neutral, or reverse positions, a lever 51 is fitted with a yoke 52 at its lower end, such yoke embracing a downturned end portion 50a of the shaft 50. As the lever 51 is moved to the right, center, or left position (as viewed in FIG. 2), then the rock shaft 50 and the finger 49 will be rotated to shift the yoke 45 to three corresponding positions which make the clutch element 38 (FIG. 1) reside in its forward, neutral or reverse positions.

For establishing an input drive connection to the impeller 19 from the input member 11 and casing 18 a disengageable two-ratio "performance" gear is provided. As here illustrated, the performance gear is one which provides a drive connection between the casing 18 and the impeller 19 at either of two ratios, and which may also provide a "neutral" or disengaged connection.

For this purpose, a planetary "performance" gear set 55 is constructed to include an input terminal member or internal annular ring gear 56 rigidly connected to and rotatable with the casing 18. Meshed with the ring gear 58 are a plurality of circularly spaced planet gears 59 journaled on and bodily carried by an intermediate member or planet carrier 60. The planet gears 59 are also in mesh with a second terminal member or central sun gear 61 formed integrally on a rotatable sleeve 62 which is journaled by appropriate bearings 64 on the stationary sleeve 22 rigidly connected to the housing 15.

To afford drive through the planet gear set 55 to the impeller 19 at either of two ratios, the impeller 19 is rigidly connected to or formed as an integral part of the planet carrier 60. First and second disengageable drive couplings are interposed respectively (a) between the sun gear 61 and the planet carrier 60, and (b) between the sun gear 61 and a stationary part 65 fixed to the housing 15.

As here shown, the first such disengageable coupling takes the form of a multiple disk clutch 68 having a first set of disks splined to the sleeve 62 integral with the sun gear 61 and a second set of interleaved disks carried by the impeller 19 which is rigidly connected to the planet carrier 60. With the clutch 68 engaged, the sun gear 61 is rigidly locked to and must rotate in unison with the planet carrier 60 and impeller 19. Therefore, the planet gear set 55 is locked and the impeller 19 is driven directly, i.e., with a 1:1 ratio, from the casing 18 and input member 11. This is the normal driving connection.

The second disengageable coupling device takes the form of a multiple disk, friction brake 69 having a first plurality of disks carried by the sleeve 62 integral with the sun gear 61 and interleaved with a second plurality of disks carried by the stationary part 65. When the clutch 69 is engaged (and the clutch 68 disengaged), the sun gear 61 is held stationary. Thus rotation of the ring gear 56 causes "working" of the planet gears 59, so that the planet carrier 60 and impeller 19 are driven from the casing 18 but with a speed-reduction ratio, i.e., the impeller is driven more slowly than the input casing 18, but with a greater mechanical advantage. This increases the output torque of the gear set 55 applied to the impeller 19 for a given input torque applied to the casing 18, and thus enables the turbine 20 and its connected shaft 26 to be more rapidly accelerated with a given amount of power supplied from an engine or the like to the input member 11. This is termed the "performance" drive connection since it affords greater torque and increased acceleration.

It will be observed that neither the "normal" drive coupling 68 nor the "performance" coupling 69 need be constructed so as to transmit the entire torque which is transferred from the housing 18 to the impeller 19. In the straight drive connection, a large portion of the torque is transferred directly from the ring gear 56 to the planet gear 59 and planet carrier 60, whereas in the "performance" drive connection the coupling 69 need only exert sufficient torque to hold the sun gear 61 stationary. Also, it will be noted that if both of the couplings 68 and 69 should be disengaged, then the sun gear 61 and its sleeve 62 would be free to spin idly, so that the casing 18 is effectively disengaged from the impeller 19. Thus, the performance gearing described provides a selectively disengageable drive connection from the input member 11 to the impeller 19.

In accordance with one feature of the present invention, a third disengageable coupling or brake is provided to releasably lock the planet carrier 60 (and the impeller 19 rigidly connected thereto) so that despite rotation of the casing 18 or the turbine 20 the impeller cannot turn. On the one hand, this prevents spurious drive or "drag" of the turbine 20 when the vehicle is at rest with its engine idling and rotating the casing 18. Thus, the turbine 20 and the shaft 26 connected therewith remain substantially stationary so that there is no relative rotation between the positive teeth of the clutch element 38 and its cooperating parts, and so that the clutch element 38 may be easily shifted into engagement either with the teeth 34 or the teeth 39. On the other hand, if the impeller 19 is locked against rotation, and the vehicle is coasting with the reversing gear 29 set either in its forward or reverse position, the vehicle wheels will drive the turbine 20, but the stationary impeller will retard the latter and thus cause a braking torque to be applied by the converter 16 to the output shaft 12 and the vehicle road wheels.

As here shown, the disengageable coupling or brake for holding the impeller 19 stationary takes the form of a multiple disk brake 70 having a first plurality of friction disks carried by an extension of the planet carrier 60 and interleaved with a second plurality of disks carried by the stationary part 65.

In keeping with the invention, means are provided to selectively and complementally engage the two couplings 68, 69 so as optionally to obtain "normal" or "performance" drive operation from the planetary gear set 55. Further, means are provided selectively to actuate the brake 70 to lock the impeller 19, but in a manner to assure that both of the coupling devices 68 and 69 are disengaged when such locking by the brake 70 occurs. Still further, the means for actuating the three coupling devices 68, 69, 70 preferably are hydraulically energized and controlled by valve means in a manner to be described.

For this purpose, a fluid pressure source is provided in the transmission and here takes the form of a gear type pump 71 having an inner gear 72 keyed at 72a to coupling pieces 73, 73a driven from casing 18. The pump further includes an outer gear 74 held stationary in the pump casing 75 which is rigidly fixed to the housing 15. Since the gear 72 always rotates with the casing 18 when the input member 11 is being driven, fluid pressure will be supplied from a sump 76 to a control valve assembly as diagrammatically illustrated in FIG. 3.

Each of the coupling devices 68, 69, 70 is hydraulically actuated. As here shown, the coupling or clutch 68 is "normally engaged" by a spring 78 which urges a plunger 79 in a direction to compress the friction disks. To disengage the coupling 68, the plunger 79 is withdrawn by a hydraulic actuator taking the form of a "piston" 80 slidable within a "cylinder" 81 formed by the planet carrier 60. Pressure fluid may be admitted to the cylinder 81 through a conduit 82 in the stationary sleeve 22 and through ports 84 communicating from that conduit. Such pressure fluid will shift the piston 80 and the plunger 79 to the right (FIG. 1) to disengage the coupling 68.

The second disengageable coupling 69 is normally released. It may be engaged by supplying pressure fluid from a passageway 85 formed within the stationary part 65 to a "cylinder" 86 in which is slidably disposed a piston 88. Such pressure fluid will shift the piston 88 to the left (FIG. 1) to compress the friction disks of the brake 69, thereby engaging the latter. The coupling 69 may be disengaged by relieving the pressure within the passageway 85, i.e., connecting the later to the sump.

The brake 70 may be selectively actuated by a piston 90 slidable within a cylinder 91 formed in the stationary part 65. Pressure fluid supplied through a conduit 92 (FIG. 3) will shift the piston 90 to the left (FIG. 1), thereby compressing the friction disks of the brake 70.

In order to control the engagement and release of the three couplings 68, 69, 70 in conjunction with shifting of the reversing clutch element 38, there are provided means to selectively and complementally engage the coupling devices 68 and 69 so as to obtain "normal" or "performance" drive through the gear set 55, and means to engage the coupling 70 automatically whenever the hand lever 51 is moved to shift the coupling element 38 (while also disengaging that one of the two couplings 68, 69 which would otherwise be engaged) so that the positive clutch teeth will mesh without clash. This is here accomplished by a valve assembly 100 (FIGS. 3–6).

As shown in FIG. 3, the valve assembly 100 includes a first valve plunger 101 movable between two positions (compare FIGS. 3 and 4) in response to energization or deenergization of a solenoid 102 associated with an armature 104 connected to the valve plunger. For example, the solenoid 102 may be connected across the vehicle battery 105 through a switch 106 controllable by the driver. Closure of the switch 106 energizes the solenoid 102 to shift the vave plunger 101 from the first position illustrated in FIG. 3 against the bias of a spring 107 to the second position illustrated in FIG. 4. It will be noted that the plunger 101 has ports 108, 109 which are normally alined with passages 110, 111 in the valve body 112 and which, as shown in FIG. 3, lead to the sump 76. Thus with the solenoid 102 deenergized and the valve plunger 101 in the position illustrated by FIG. 3, the conduits 82 and 85 leading to the cylinders 81 and 86 are both vented. Therefore, the coupling 68 is held engaged by the spring 78, and the coupling 69 is released. Thus, the planetary gear set 55 is conditioned for normal driving operation.

If, however, the operator closes the switch 106 to shift the valve plunger 101 to the position illustrated in FIG. 4, then the ports 108 and 109 become alined with passageways 113, 114 in the valve head 112, such passageways being connected to the output of the pump 71. Fluid pressurs is thus applied to the conduits 82 and 85, thereby shifting the pistons 80 and 88 respectively to the right and left (FIG. 1), so that the coupling 68 is disengaged and the coupling 69 is engaged. Under these circumstances the planetary gear set 55 is conditioned to drive the impeller 19 from the casing 18 with a speed reduction ratio which provides the "performance" operation.

In order to control the coupling or brake 70 so that the impeller 19 is prevented from rotating when the vehicle is at rest and the reversing clutch element 38 is being shifted, and in order to make it possible for the vehicle operator to obtain braking of the vehicle from the torque converter 16, a second valve plunger 120 is slidably disposed and movable between two effective positions within the valve body 112. When the valve plunger 120 is in its first or normal position illustrated by FIGS. 3 and 4, a port 121 formed therein establishes communication between passageways 122, 123 in the valve body, the former leading to the sump 76 and the latter leading to the cylinder 91. With the valve plunger 122 thus positioned, the brake 70 is released, and the planetary gear set drives the impeller 19 either with a 1:1 or 1:1.35 ratio depending upon the position of the valve plunger 101.

On the other hand, if the valve plunger 120 is shifted downwardly to either of the positions illustrated by FIG. 5 or FIG. 6, then the valve port 121 is positioned to establish communication between a passageway 124 leading from the output of the pump 71 to the passageway 123, the conduit 92 and the cylinder 91. The brake 70 is engaged to hold the planetary carrier 60 and the impeller against rotation.

Whenever the brake 70 is engaged, both the coupling devices 68 and 68 are automatically dsengaged. That is, the particular one of the coupling devices 68 or 69 which would otherwise be engaged as determined by the position of the valve plunger 101 is automatically released. To effect this automatic disengagement of the coupling device 68 or 69 which would otherwise be engaged, the valve plunger 120 is formed with ports 125, 126 and 127. With the plunger 120 in the first position illustrated by FIGS. 3 and 4, the port 125 is inactive and the port 126 establishes connection from the passageway 110 to the sump 76. The port 127 connects the output of the pump 71 to the passage 114. Under these circumstances, therefore, the valve plunger 101 by its position determines the complemental engagement of the coupling devices 68, 69 as previously explained.

When, however, the plunger 120 is shifted downwardly against the bias of a spring 130 to either of the positions illustrated by FIGS. 5 and 6, the port 125 connects the passageway 114 to the sump 76, thus venting the cylinder 86, irrespective of whether the plunger 101 is in its upper or lower position (compare FIGS. 5 and 6). Also, the port 126 connects a passageway 129 leading from the output of the pump 71 to the conduit 110, thereby supplying pressure fluid through the valve port 108 to the cylinder 81 irrespective of the position of the valve plunger 101 (compare FIGS. 5 and 6).

It will be seen, therefore, that whenever the brake 70 is engaged by movement of the plunger 120 to the lowered position illustrated by FIGS. 5 and 6, both of the coupling devices 68 and 69 are always disengaged.

Provision is made to control the position of the brake valve plunger 120 from the lever 51 and in a manner such that the brake 70 is engaged and the impeller 19 locked whenever the clutch element 38 is being shifted. As shown in FIG. 2, the hand lever 51 and the yoke 52 connected therewith are pivotally connected to the depending portion 50a of the rock shaft 50 by a pin 131, such pivot connection enabling the lever to be moved in a second direction which is transverse to the first direction of movement which determines the forward, reverse, or neutral setting of the clutch element 38. Means are provided to releasably lock the lever at any of three positions along the first direction of movement.

As here shown, a gate or locking plate 132 is provided with a plurality of notches 134, 135 and 136 into which the lever 51 slips after it has been shifted to the forward, neutral or reverse position. The lever cannot be shifted in a direction to rock the shaft 50 and shift the yoke 45 unless it is first moved in a transverse direction free of the notches 134–136. Once it has been moved free of the notches, then it can be shifted in a lengthwise slot 138, and reinserted into another one of the notches. Thus, the lever 51 is movable to three positions in a first direction in order to set the positive clutch elements 38 in forward, neutral or reverse, and is movable between two positions in a second, transverse direction. The lever is locked when in the first such transverse position (engaged in one of the notches) and is free for movement when in the second transverse position.

In order to automatically engage the brake 70 and hold the impeller 19 when shifting of the clutch element 38 occurs, the yoke 52 is disposed opposite an abutment 140 carried on one end of a lever 141 pivoted at 142 to a bracket 143 and having its opposite end 144 engaged with the valve plunger 120. It will be apparent, therefore, that whenever the hand lever 51 is to be shifted from one of the notches 134–136 to another, that lever must first be moved in a transverse direction so that the yoke 52 rocks the lever 141 in a counterclockwise direction (as viewed in FIG. 2) thereby depressing the valve plunger 120 to the position illustrated in FIG. 6. This, as noted above, automatically causes engagement of the brake 70 and disengagement of both the coupling devices 68 and 69. Thus, the input member 11 and casing 18 may continue to rotate freely, but the impeller 19 is held stationary. Under these conditions there is no "drag" torque or appreciable tendency of the turbine 20 to rotate. Accordingly, the turbine output shaft 28 and the sun gear 30 at its right end (FIG. 1) remain stationary, so that the teeth on the clutch element may be easily shifted into engagement with either of the mating sets of teeth 34 or 39. This arrangement, therefore, assures that the positive clutching element 38 may be engaged easily when the vehicle is at rest but with the engine idling and driving the input member 18, even though there has been no direct disengagement of the engine from the casing 18.

Moreover, this operation occurs regardless of whether the operator has conditioned the gearing 55 for operation at a 1:1 or 1:1.35 drive ratio. The valve plunger 120 effects the necessary control regardless of the position of the valve plunger 101.

In transmissions utilizing fluid torque converters there is very little braking torque applied from the engine to the road wheels when the vehicle is coasting, and this is particularly true in the present instance if the gear 55 has been set for operation in the 1:1 ratio. Release of the vehicle accelerator so that the engine tends to idle simply lets the vehicle coast fairly freely.

The present transmission, however, enables braking torque to be supplied to the wheels of a coasting vehicle whenever the operator desires this additional braking either independently of or in assistance to the wheel brakes. All the operator need do to obtain this braking action is to shift the hand lever 51 out of one of the notches 134–136 and into the slot 138 (FIG. 2). This, as noted above, will always cause disengagement of the coupling devices 68, 69 and engagement of the brake 70. Therefore, assuming that the lever 51 is at the extreme right or left end of the slot 138 so that the clutch element 38 is set in its forward or reverse positions, the road wheels will drive the output shaft 12, the shaft 28 and the turbine 20. The impeller 19, however, will be locked against rotation by the brake 70. Therefore, the impeller will exert a considerable retarding torque on the turbine 20 and this will be transferred through the shaft 28, the reversing gear 29 and the shaft 12 to the vehicle road wheels. Emergency braking from the transmission, either independently of or in supplement to the action of the wheel brakes, may thus be obtained when the vehicle is in motion simply by shifting the hand lever 51 out of the notches 134–136 and into the slot 138.

If it should be desired that such emergency braking be continued for relatively long periods of time while the vehicle is coasting forwardly, the lever 51 may be moved into a keeper notch 145 formed in the plate 132 opposite the notch 134. This rocks the lever 141 to shift the valve plunger 121 further into the valve body 112 as shown in FIG. 5. The effective control connections in the valve assembly remain the same as those established with the valve plunger positioned as shown in FIG. 6. The keeper notch 145 simply assures that the lever 51 will be maintained in the "forward" position and in the "braking" position so that the retarding effect of the transmission is maintained.

In order to prevent the hand lever 51 from being shifted inadvertently into the keeper notch 145, a slidable collar 146 is disposed on the lever and biased upwardly by a spring 148. The diameter of the collar is so large that it cannot pass a tab 149 which narrows the entrance to the keeper notch 145 unless the collar is shifted downwardly by depression of a finger piece 150 leading through a rod 151 to shift the collar 146 downwardly. The upper end of the collar 146 is tapered so that when the collar is depressed, the hand lever can be shifted into the keeper notch 145.

From the foregoing, it will be apparent that the transmission here disclosed is one which effectively and automatically facilitates the shifting and engagement of positive clutch elements disposed on the output side of the fluid torque converter even though the input to the torque converter continues to rotate, e.g., is driven from an idling engine. Moreover, the transmission is one in which a braking or retarding action on the output member or vehicle wheels is obtainable from the torque converter itself. Finally, the transmission is one in which a performance gear can be set in either of two driving ratios, yet in which that performance gear is always automatically neutralized whenever shifting of the positive clutch element is to occur or whenever positive braking action on the output member is desired.

I claim as my invention:

1. In an automotive transmission having an input member adapted to be driven from an engine and an output member adapted to be drivingly connected to road wheels, the combination comprising a fluid torque converter having a rotatable casing, impeller and turbine, a drive connection from said input member to said casing, a reversing drive means interposed between said turbine and said output member and including a positive tooth clutch element shiftable to alternatively engage with mating toothed elements to provide forward or reverse drive connections, interruptable drive means interconnected between said casing and impeller, releasable means for braking said impeller, means for shifting said clutch element, and means for preventing operation of said shifting means unless said drive means are interrupted and said braking means are actuated, so that said turbine remains substantially stationary when said clutch element is being shifted thereby to facilitate engagement of the clutch teeth.

2. In a transmission for transmitting drive from an engine to road wheels of an automotive vehicle, the combination comprising a fluid torque converter having a rotatable casing, impeller and turbine, means adapting said casing to be driven from the engine, a reversing drive interposed between said turbine and the road wheels, said reversing drive including a positive clutch element movable to three positions and means including two mating elements for producing "forward" and "reverse" drive connections or a "neutral" disconnection between the turbine and road wheels, means interconnected between said casing and impeller for interruptably driving the latter from the former, releasable means for braking said impeller, a lever shiftable to three positions and connected to shift said clutch element to its corresponding three positions, releasable locking means for holding said lever in any one of its three positions, and control means responsive to the release or engagement of said locking means for respectively (a) disengaging said drive means and engaging said braking means or (b) engaging said drive means and releasing said braking means, whereby said turbine remains substantially stationary when said lever is shifted to facilitate engagement of said clutch element, and whereby the torque converter retards the road wheels when said locking means are released.

3. The combination set forth in claim 2 further characterized by first and second hydraulic actuators for respectively controlling said disengageable drive means and said releasable braking means, a valve controlling said actuators, and said control means including means for moving said valve to two respective positions in response to release or engagement of said locking means.

4. The combination set forth in claim 3 further characterized in that said lever is shiftable in a first direction to said three positions, and is also movable in a second direction between first and second limit positions, said locking means include means for preventing or affording movement of said lever in said first direction whenever the lever is respectively at said first or second limit positions, said control means being responsive to positioning said lever in said second direction.

5. The combination set forth in claim 2 further characterized in that said interruptable drive means comprises two releasable coupling devices and means responsive to respective actuation thereof for driving said impeller at first and second speed ratios from said casing, means for complementally actuating said coupling devices, and means for de-actuating both of said coupling devices in response to release of said locking means.

6. In a transmission, the combination comprising an input member adapted to be rotatably driven, a fluid torque converter having a rotatable casing, impeller and turbine, means connecting said input member to said casing, first and second disengageable coupling devices, means for selectively and complementally engaging said coupling devices, means associated with said devices for driving said impeller from said casing with first and second speed ratios when said first and second devices are respectively engaged, means for releasably braking said impeller, and means for disengaging both of said coupling devices as an incident to actuation of said braking means.

7. In a transmission, the combination comprising an input member adapted to be rotatably driven, a fluid torque converter having a rotatable casing, impeller and turbine, means connecting said input member to said casing, a planetary gear set having first, second and third terminal elements, means connecting said first terminal element with said casing, means connecting said second terminal element with said impeller, a first disengageable coupling between said second element and third element, a stationary part, a second disengageable coupling between said third element and said stationary part, a normally disengaged brake operative on said second terminal element, means for selectively engaging one or the other of said coupling devices, and means for disengaging both of said coupling devices as an incident to engagement of said brake.

8. In a transmission for transmitting rotation from the engine to the road wheels of an automotive vehicle, the combination comprising a fluid torque converter having a rotatable casing, impeller and turbine, means adapting said casing to be driven from the engine, a two-ratio gear set interposed between said casing and impeller and including first and second disengageable coupling devices connected to drive said impeller from said casing with first and second ratios when said first and second devices are respectively engaged and to interrupt such drive when neither device is engaged, a disengageable brake operative on said impeller, first, second and third hydraulic actuators for respectively controlling said first and second coupling devices and said brake, a first two position valve and means connecting the same with said first and second actuators to cause the first and second coupling devices to be selectively and complementally engaged, a second two-position valve and means connecting the same to said third actuator to engage and release said brake, and means interconnecting said two valves to cause disengagement of both said coupling devices when said brake is engaged regardless of the position of said first valve.

References Cited in the file of this patent

UNITED STATES PATENTS

| | | |
|---|---|---|
| 2,176,138 | Kelley | Oct. 17, 1939 |
| 2,196,660 | Dodge | Apr. 9, 1940 |
| 2,224,884 | Schneider et al. | Dec. 17, 1940 |
| 2,687,657 | Kugel | Aug. 31, 1954 |
| 2,854,862 | Foerster | Oct. 7, 1958 |
| 2,949,047 | Burckhardt | Aug. 16, 1960 |